US009611519B2

(12) United States Patent
Buchet et al.

(10) Patent No.: US 9,611,519 B2
(45) Date of Patent: Apr. 4, 2017

(54) PROCESS AND INSTALLATION FOR HEATING A METALLIC STRIP, NOTABLY FOR AN ANNEALING

(71) Applicant: GDF SUEZ, Paris (FR)

(72) Inventors: Philippe Buchet, Combs la Ville (FR); Nicolas Richard, Saint-denis (FR); Pierre-Jacques Lhomme, Versailles (FR)

(73) Assignee: GDF SUEZ, Paris (FR)

( * ) Notice: Subject to any disclaimer, the term of this patent is extended or adjusted under 35 U.S.C. 154(b) by 660 days.

(21) Appl. No.: 13/909,343

(22) Filed: Jun. 4, 2013

(65) Prior Publication Data

US 2013/0277896 A1  Oct. 24, 2013

Related U.S. Application Data

(63) Continuation of application No. 12/601,446, filed as application No. PCT/FR2008/050874 on May 20, 2008, now abandoned.

(30) Foreign Application Priority Data

May 30, 2007 (FR) ...................... 07 03823

(51) Int. Cl.
| C21D 9/54 | (2006.01) |
| F23L 15/02 | (2006.01) |
| C21D 9/00 | (2006.01) |
| C21D 1/34 | (2006.01) |
| C21D 9/56 | (2006.01) |
| F27B 9/02 | (2006.01) |

(Continued)

(52) U.S. Cl.
CPC ............... *C21D 9/54* (2013.01); *C21D 1/34* (2013.01); *C21D 9/0006* (2013.01); *C21D 9/56* (2013.01); *F23L 15/02* (2013.01); *F27B 9/02* (2013.01); *F27B 9/28* (2013.01); *F27B 9/36* (2013.01); *F27D 13/00* (2013.01)

(58) Field of Classification Search
CPC .......... C21D 1/34; C21D 9/56; C21D 9/0006; C21D 9/54; F27B 9/02; F27B 9/28; F27B 9/36; F23L 15/02; F27D 13/00
USPC ..... 266/44, 78, 87, 102, 103, 155, 156, 159, 266/249; 432/214; 165/4, 10, 9.2, 9.3
See application file for complete search history.

(56) References Cited

U.S. PATENT DOCUMENTS 5,304,059 A * 4/1994 Tanaka ............... F23L 15/02
126/91 A
6,007,761 A * 12/1999 Nakagawa ............ C21D 9/56
266/103

(Continued)

*Primary Examiner* — Scott Kastler
*Assistant Examiner* — Michael Aboagye
(74) *Attorney, Agent, or Firm* — Young & Thompson

(57) ABSTRACT

The invention pertains to the heating of a metal strip, and relates to equipment for heating a metal strip that comprises a pre-heating housing provided with a device for projecting hot gases towards the strip, a heating housing with regenerative burners, a duct for discharging the gases from the heating housing, a three-way adjustable valve and an adjustment device including a sensor for detecting the setpoint temperature of the metal strip and a member for adjusting the three-way valve so that it can adjust the amount of hot gases fed to the projection device. The invention can be used in equipment for heating narrow strips before annealing the same.

7 Claims, 2 Drawing Sheets

(51) Int. Cl.
*F27B 9/28* (2006.01)
*F27B 9/36* (2006.01)
*F27D 13/00* (2006.01)

(56) References Cited

U.S. PATENT DOCUMENTS

| | | | |
|---|---|---|---|
| 6,880,619 B1 * | 4/2005 | Suzukawa | F23L 15/02 |
| | | | 165/10 |
| 2010/0213647 A1 * | 8/2010 | Buchet | C21D 1/34 |
| | | | 266/44 |

* cited by examiner

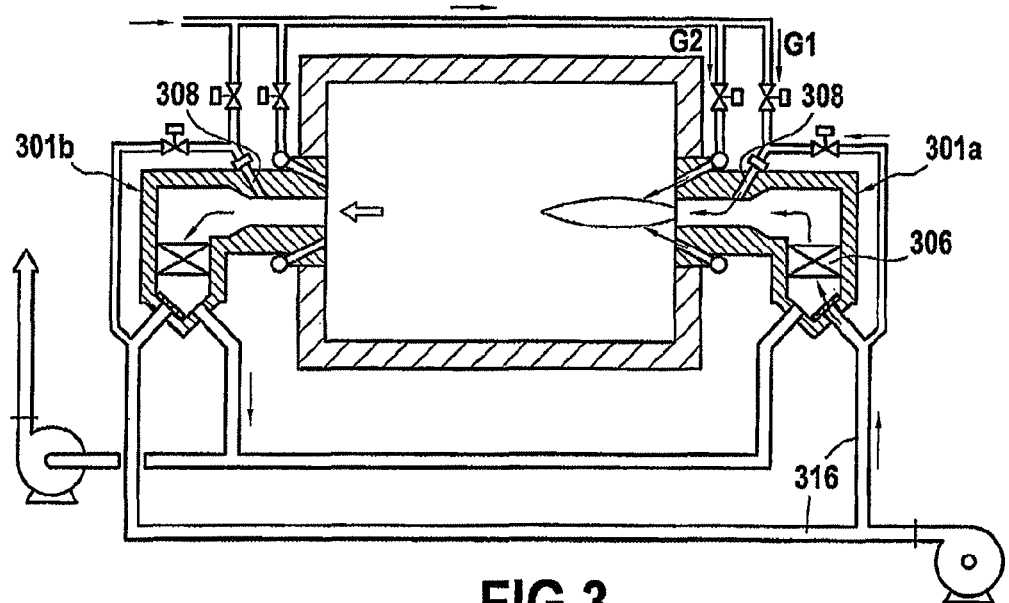
FIG.3
(PRIOR ART)
FIG.4
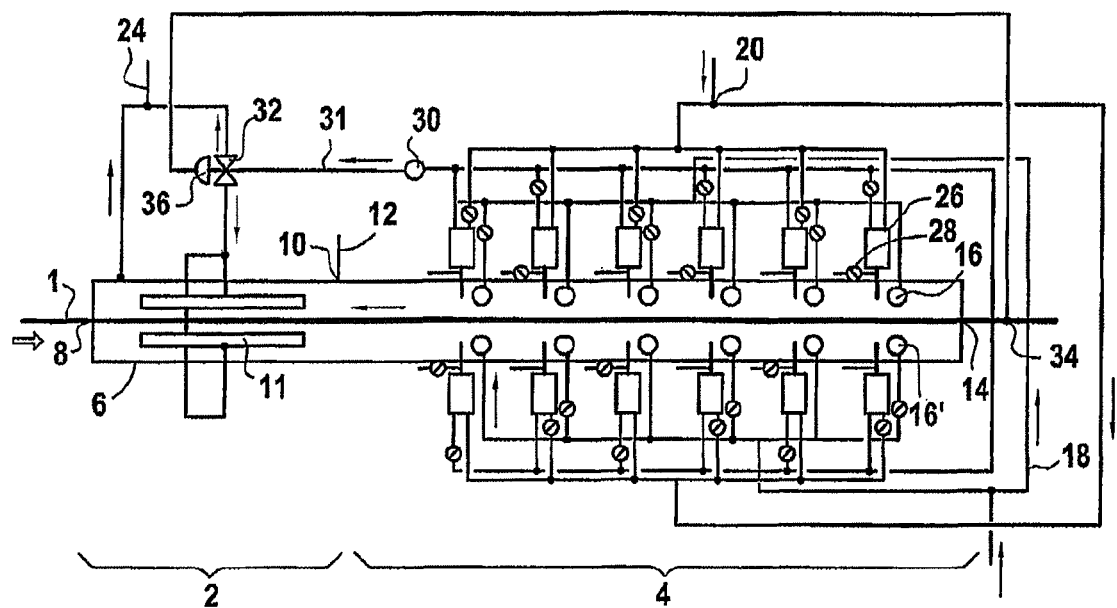

PROCESS AND INSTALLATION FOR HEATING A METALLIC STRIP, NOTABLY FOR AN ANNEALING

BACKGROUND OF THE INVENTION

Field of the Invention

The invention relates to a process and an installation for heating a metallic strip to a set temperature needing the presence of a reducing combustion atmosphere (lack of fuel in comparison with stoechiometric quantity).

The invention is described as for its application to heating of a metallic strip in the form of a strap transmitted to an annealing installation, notably for making galvanized steel.

Description of the Related Art

Various types of annealing installations for straps are already known.

FIG. 1 is a schematic view of a first example of a known installation for preheating a strap to a set temperature appropriate to an annealing installation. It comprises an oven delimiting a chamber 102 for preheating the strap 100 and a chamber 104 for heating the strap in order that, at the installation exit, the strap is at a set temperature, for example of 750° C.

In the preheating chamber 102, comprised between the oven entry 108 and a place 110 where post-combustion air from a duct 112 is injected, hot gases with no reducing power, so that the atmosphere in the oven, which could flow out through the entry 108, is not toxic (i.e. it contains no CO), flow from the heating part 104 to the proximity of the entry 108, in a direction opposite that of the strap 100. The heat exchanges between a surface and a current parallel to this surface are not very efficient, because of the presence of laminar layers. Consequently, the chamber 102 must have a great length.

In the combustion chamber 104, practically comprised between the air injection place 110 and the oven exit 114, burners 116 receive a fuel transmitted by a feed circuit 118 connected to each burner 116, and combustion air by a circuit 120 also connected to each burner. The air in the circuit 120 has been preferably preheated in a heat exchanger 122 in which also circulate the hot gases evacuated by a duct 124 from the proximity of the oven entry end 108.

In the heating chamber 104, the burners 116 are open fire burners working in a reducing combustion atmosphere, i.e. in the presence of CO. In the heating chamber 104, the strap temperature increases from a temperature around 350 to 400° C., near the air injection place 110, to a set temperature for example of 750° C. at the exit 114.

The just-described installation has some drawbacks.

First, because of the simple circulation of the hot gases in the direction opposite that of the strap in the preheating chamber 102, the heat exchange between the gases and the strip is not efficient, so that the chamber 102 has a very great length and the oven takes up thus much room.

Then, the whole system using open fire burners for forming the reducing combustion atmosphere with the air preheated by the exchanger 122 has a relatively low efficiency, in the order of 50%, so that the fuel consumption is high.

At last, the heat losses are important, essentially due to the evacuation of the gases, still at a high temperature, into the atmosphere, because the heat exchanger 122 which collects the heat of the gases evacuated by the duct 124 has a moderate efficiency.

In the document JP2002-294 347, it is also described another example of a known installation for preheating a strap, before annealing it, which does not have the drawback of taking up very much room at the floor level.

More precisely, this installation comprises a preheating chamber 202 with a small length, because it comprises a device 210 for preheating the strap by projecting hot gases in a direction perpendicular to the strap. This device comprises chambers whose wall, facing the strap, comprises a plurality of orifices projecting as many jets of hot gases. Such a device 210, sometimes called "plenum", enables to get an efficient heat exchange over a small length.

This preheating chamber 202 is connected to a preheating chamber 204 in which the strap follows a zigzag path between radiant tubes. The preheating chamber and the heating chamber have the same protective atmosphere. The combustion gases evacuated by the radiant tubes, which are separated from the protective atmosphere in the chamber 204, are extracted by ducts 205 to a heat exchanger 26, with the help of a blower 207. In the heat exchanger 206, a protective atmosphere circulates under the control of a blower 208. The circulation circuit comprises two parallel connected ducts, one duct 209 feeding the device 210 for projecting hot gases onto the strap and another duct 211 comprising a control valve 212 which opens more or less for modulating the quantity of gas transmitted to the device 210 for projecting hot gases.

Thus, the set temperature sensor 218, which measures the temperature of the strap at the installation exit, enables to control the valve 212 in order that it regulates the quantity of gas able to circulate through the duct 209, and thus the preheating power of the projection device 210, in order that the set temperature, measured by the sensor 218, does not vary.

The installation, represented in FIG. 2, does not have the drawback of taking up much room, but it has other drawbacks.

First, the efficiency of the radiant burners used is not high.

Then, as the heat of the combustion gases is only partially collected by the heat exchanger 206, the installation has an energetic efficiency which is relatively reduced and does not exceed a value in the order of 50%.

Moreover, the whole installation, comprising both chambers and the gas circuit for feeding the chambers for projecting gases onto the strap, contains a protective atmosphere which can be toxic and then does not fulfill the "hygienic" requirements for the combustion, or which is inert and expensive.

At last, as the strap follows a sinuous path inside the preheating chamber, the installation is onerous and prone to failures.

Preheating units with "regenerative" burners are otherwise known, notably from the document JP-2001/304 539. The term "regenerative" indicates that, in a first phase, some heat extracted from combustion gases is accumulated, and, in a second phase, the accumulated heat is returned to the combustion air. Such units usually comprise two burners 301a, 301b which are mounted in tandem, the one working in a combustion mode in which some combustion air in a duct 316 circulates through a regenerative mass 306 before participating to a combustion, and the other working in a heat recuperation mode in which the combustion gases from the first burner circulate through its regenerative mass 306 and heat it. After a certain length of time, for example a fraction of a minute, both burners exchange their ways of working.

SUMMARY OF THE INVENTION

In the present invention, each burner 301a, 301b also comprises an air feeding device 308 which, in the regeneration mode, introduces post-combustion air which mixes with the combustion gases before these circulate through the regenerative mass 306. A regenerative mass can be formed of a ceramic, for example in the form of balls.

Thanks to the heat recuperation by the combustion air in the regenerative mass 306 and to the absorption of the post-combustion heat of still reducing gases with the post-combustion air introduced by the device 308, the efficiency of the heating unit is increased in a very important manner in comparison with that of simple open fire burners working in a reducing combustion atmosphere and used in an installation of the type described in reference to FIG. 1.

We do not currently know any use of such heating units with regenerative burners in continuous heating installations, for example of the type used for feeding an annealing installation for straps.

BRIEF DESCRIPTION OF THE DRAWING FIGURES

FIG. 3 is a schematic view of an example of an installation.

FIG. 4 is a schematic view of an example of an installation according to the present invention.

DETAILED DESCRIPTION OF THE INVENTION

Figure 1:
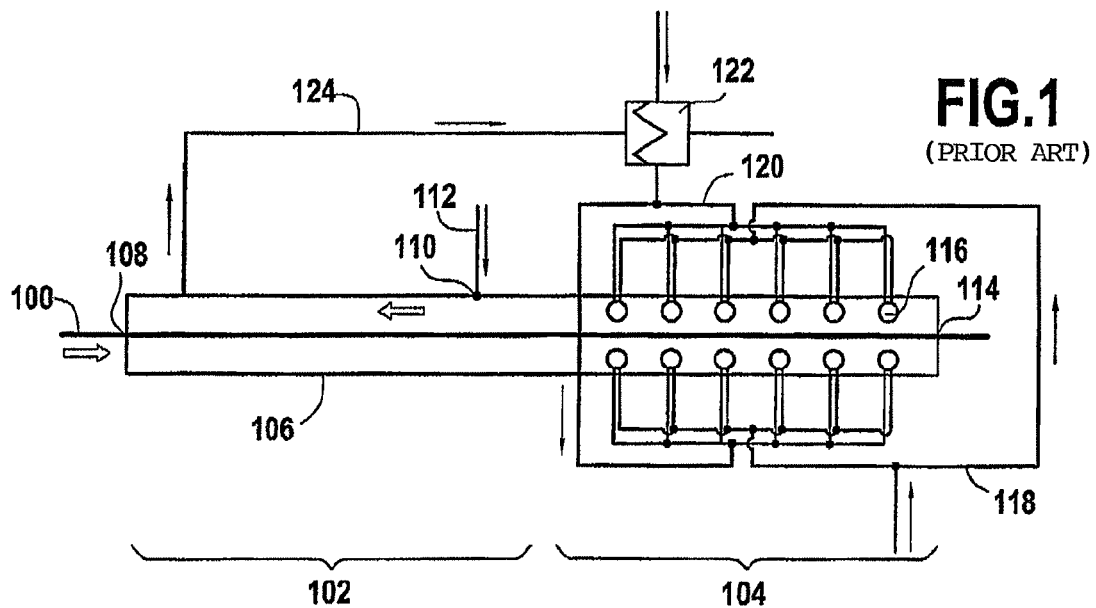
FIG. 1 is a schematic view of an example of an installation.
Figure 2:
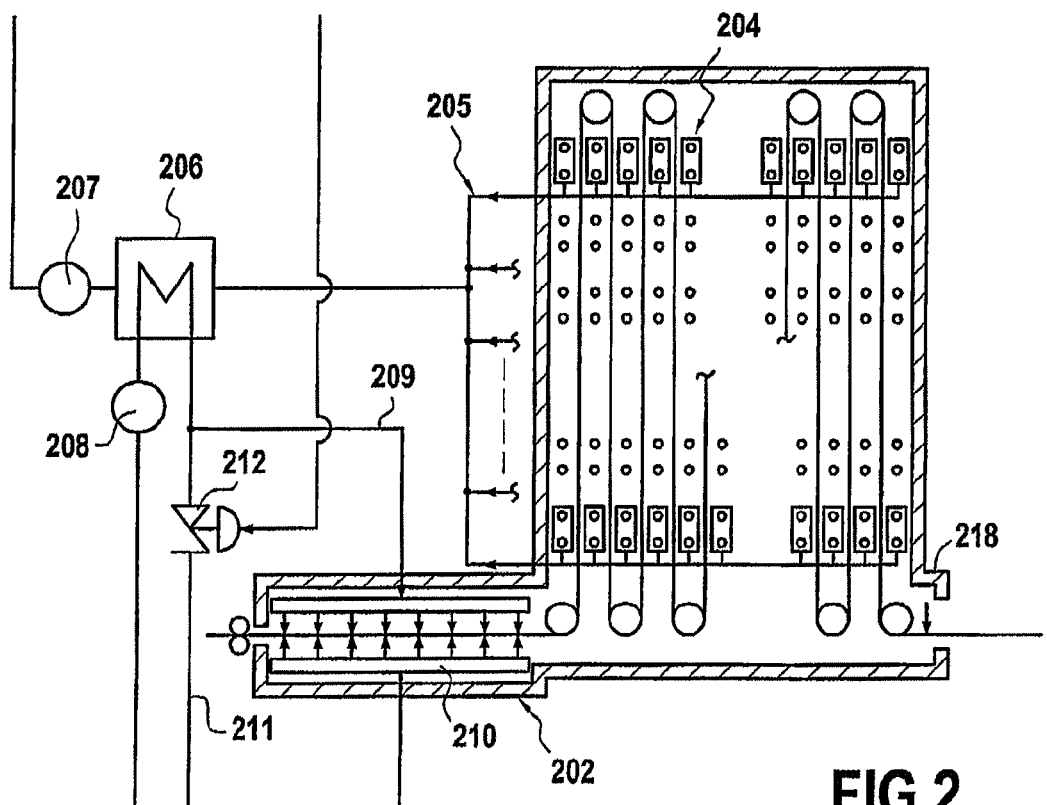
FIG. 2 is a schematic view of an example of an installation.

The invention implements a combination of characteristics of the installations represented in FIGS. 1 and 2 and of the regenerative burners represented in FIG. 3, while reducing heat losses due to the use of heat exchangers. The gases that are evacuated from the regenerative burners are projected onto the strap in the preheating zone, participate to a noticeable increase in the total thermal efficiency of the installation and enable to control the temperature. Besides, a protective atmosphere which can be toxic exists only inside the heating chamber, and the installation thus works in good "hygienic" conditions for the combustion.

More precisely, the invention relates to a process for heating a metallic strip to a set temperature needing the presence of a reducing combustion atmosphere, of the type comprising a preheating of the strip to an intermediary temperature needing not the presence of a protective atmosphere, by projecting hot gases towards at least one side of the strip, and a heating of the strip in a reducing combustion atmosphere from the intermediary temperature to the set temperature, with the control of the set temperature by varying the projection of hot gases for the preheating; according to the invention, the preheating in a reducing combustion atmosphere is carried out by means of regenerative open fire burners in a first phase which comprises, in at least one first burner, a combustion with the help of air that has absorbed heat from a first thermal absorption mass, and, in at least one different burner, a heat absorption regeneration of the combustion gases from the first burner by at least one different thermal absorption mass, and in a second phase in which the functions of at least the first burner and at least the different burner on the one hand and the functions of the first thermal absorption mass and of the other thermal absorption mass on the other hand are reversed, the heat absorption regeneration of the combustion gases is carried out in an operation which comprises, before the passage of the combustion gases through the regeneration mass, the mixing of these combustion gases to an additional quantity of post-combustion air, the preheating by projection of hot gases comprises the use of at least a part of the gases evacuated from the heating by regenerative burners, and the control of the set temperature comprises the adjustment of the quantity of hot gases for the projection preheating.

Preferably, the adjustment of the quantity of hot gases used for the preheating comprises the adjustment of the proportions of the hot gases transmitted to the projection step on the one hand and to the hot gas evacuation step on the other hand.

Preferably, the quantity of air introduced for the mixing to the combustion gases is sufficient for the evacuated gases to have no reducing power.

Preferably, the mixing of the combustion gases to the post-combustion air introduced before the passage of the combustion gases through the regenerative mass is adjusted according to the result of a measure of the reducing power of the combustion gases.

Preferably, the process comprises the implement of a gas circulation directly from the heating step to the preheating step and the injection of post-combustion air between both these steps.

In an example, the intermediary temperature is in the order of 400° C., the set temperature is a temperature for annealing the metallic strip, the metal of the metallic strip is steel, and the metallic strip is a strap.

The invention also refers to an installation for heating a metallic strip to a set temperature needing the presence of a reducing combustion atmosphere, which comprises a preheating chamber provided with a projection device for projecting hot gases towards the strip, a heating chamber provided with an open fire heating unit for heating in a reducing combustion atmosphere, the heating unit comprising at least two regenerative burners working in tandem, at least one of the burners working in a combustion mode in which the combustion air circulates through a regenerative mass before participating to a combustion, and at least another burner working in a heat recuperation mode in which the combustion gases from at least the first burner circulate through the regenerative mass of the other burner and heat it, the at least two burners exchanging theirs working modes, each burner comprising an air feeding device working in a regeneration mode, in order that this air mixes up to the combustion gases in the reducing state before they circulate through the regenerative mass, a duct for evacuating the gases from the heating unit, an adjustable three-way valve with an entry connected to the duct for evacuating the gases from the heating unit, an exit connected to the gas projection unit of the preheating chamber, and an exit connected to a duct for evacuating the gases outside the installation, and a control device comprising a set temperature sensor for the metallic strip and an adjustment component for the three-way valve, in order that this valve controls the quantity of hot gases transmitted to the projection device.

Preferably, the air feeding device working in a regeneration mode introduces an essentially constant quantity of air, which is at least sufficient for the evacuated gases to have always no reducing power.

Preferably, a second control device, which comprises a sensor for measuring the reducing power of the gases and an adjustment component for adjusting the introduced quantity of air according to the signal from the sensor for measuring the reducing power, controls the quantity of air introduced by the air feeding device.

Preferably, the preheating and heating chambers are adjacent and collinear.

Preferably, the installation further comprises a device for introducing post-combustion air between the preheating and heating chambers, the quantity of air introduced by this device being sufficient for the preheating chamber to contain gases with no reducing power.

In comparison with the installation represented in FIG. 1, the advantage of the invention is that it enables the realization of an installation with a reduced length, thanks to the considerable reduction of the preheating zone.

In comparison with the installation represented in FIG. 1, the advantage of the invention is that it is simpler, insofar as the strap follows a linear path.

In comparison with all the described installations, the invention enables to considerably reduce energetic losses and to very significantly increase the energetic efficiency, essentially obtained by using units with regenerative burners and thanks to the absence of any heat.

Thus, if an installation, such as represented in FIG. 1, has a total energetic efficiency in the order of 50%, the efficiency of a similar installation of the type represented in FIG. 4 will greatly exceed 60%.

All these advantages are obtained by combining the use of a rectilinear path, the use of a projection preheating device, the use of open fire burners of regenerative type, and the use of a set temperature control by the preheating device. More precisely, the regenerative burners are implemented in order to obtain a temperature of the evacuated combustion gases which is much higher than in the state of the art. Indeed, in all the known applications, the regenerative burners, whether they work in an oxidizing atmosphere or in a reducing atmosphere, produce combustion gases at temperatures in the order of 150° C. It is partly for these reasons that all the known regenerative burners, including that of the type described in the document JP-2001/304 539, are implemented with an evacuation of the combustion gases to the atmosphere. Within the scope of the invention, the burners work on the contrary so as to obtain a hot gas temperature which enables their direct use by projection into the preheating chamber, advantageously in the order of 400° C.

Other characteristics and advantages of the invention will be better understood from the reading of the following description of an embodiment; in the figures, FIG. 4 is a schematic representation of an installation according to the invention, the FIGS. 1 to 3 having already been described.

The installation represented in FIG. 4 comprises a number of parts similar to those in FIG. 1.

Thus, a strap 1 enters an oven 6 which comprises a first chamber 2 working in an oxidizing environment, or at least in an environment with no reducing power, and a second chamber 4 with a reducing combustion atmosphere. The strap entry 8 enables only the passage of the atmosphere in the first chamber 2, i.e. an atmosphere which is not toxic and which contains no CO, thanks to the introduction of post-combustion air through an entry 10, with the help of a duct 12. The strap leaves the oven through an exit 14 at a set temperature, after passing the burners 16. These burners are supplied with fuel by a circuit 18 and with air by a circuit 20. The gases, which are evacuated in the end near the entry 8, leave the installation through a duct 24 which is connected, for example, to a smokestack.

The other characteristics of the installation represented in FIG. 4 are different from those in FIG. 1.

First, the preheating chamber 2 comprises a device 11 for projecting hot gases for the preheating, which device is supplied with hot gases by the heating chamber 4, as described afterwards.

Each open fire burner 16 is associated to a regenerative mass 26, similar to the regenerative mass 306 described in reference to FIG. 3. A post-combustion air entry 28 is similar to the entry 308 described in reference to FIG. 3. Two burners 16 and 16', arranged one opposite the other, work in tandem, in the manner described in reference to FIG. 3.

In a first embodiment, the quantity of post-combustion air introduced through the entry 28 placed before the regenerative mass 26 can be sufficient for the gases evacuated by the burner to have always no reducing power. In that case, the burners work with an excess of post-combustion air.

In a variant, a reducing power sensor (not represented) is incorporated in the burners, before or after the regenerative mass, in order to control the quantity of post-combustion air introduced in each burner. In this manner, the thermal efficiency is optimized and the energy consumption of the burners is reduced to the minimum.

Despite the post-combustion reaction which emanates an additional quantity of heat, notably by combustion of CO in the reducing combustion atmosphere, the gases evacuated by the regenerative masses 26 are at a temperature which is sufficiently low for the transmission of a combustion gas evacuation duct 31 by a blower 30 to a three-way control valve 32 and to the hot gas projection device 11, at a temperature which needs not the presence of a reducing combustion atmosphere for the strap. The presence of a blower, which is in all the cases necessary to extract the combustion gases, further enables to take advantage of the dynamic pressure acquired by these gases to increase the thermal efficiency of the projection preheating. This also contributes to the increase in the efficiency of the system according to the invention.

It is also represented a temperature sensor 34 for determining the set temperature of the strap 1 at the exit of the oven 6. A control circuit (non represented), for the control according to the temperature determined by the sensor 34, controls an operation device 36 which adjusts the three-way valve 32. In this manner, the quantity of gases evacuated from the burners, which is used for the preheating in the device 11, can be regulated at a high reaction speed, necessary because of the high speed of the strap in the oven.

The heating chamber 4 in the installation represented in FIG. 4 has a length similar to that of the heating chamber 104 in the installation represented in FIG. 1. On the contrary, the preheating chamber 2 in the installation represented in FIG. 4 is much shorter than the chamber 102 in the installation represented in FIG. 1.

The installation represented in FIG. 4 enables a linear passage of the strap 1 which is simply locally supported by some rolls inside the oven, contrary to the complex installation for the zigzag circulation of the strap in the installation represented in FIG. 2. Thanks to the presence of two distinct atmospheres, the one which can be oxidizing and is not reducing in the combustion sense, in the preheating chamber, and the other which is reducing in the combustion sense, in the heating chamber, the combustion gases can be used directly for the preheating, contrary to the installation represented in FIG. 2 which needs a heat exchanger between the combustion gases and the gases used for preheating the strap.

Another advantage of the invention lies in the fact that, thanks to the preheating to a high temperature and to the increase in the thermal efficiency of the regenerative masses in the burners, which can reach 80%, the evacuated smokes can contain reduced quantities of nitrogen oxides NOx, for example inferior to 200 mg/m³ in normal conditions for 3% of oxygen in the smokes, when this system for preheating the combustion air is associated to a high-performance technique as regards pollutant emissions (for example flameless oxidation). Besides, thanks to the increase in the thermal efficiency of these high-performance burners, it is possible to heat the strap more quickly and thus to get an increase in productivity, with a reduction of fuel consumption and of nitrogen oxide emission.

Though the invention has been described as for its application to the heating of a metallic strip, this heating can be considered as a real thermal treatment, and not as a simple operation prior to a thermal treatment, such as an annealing.

The invention has thus important advantages, not only from the profitability and cost point of view, but also from the point of view of fossil resources preservation and of environment protection, thanks to the reduction of consumed fuel and emissions and to the increase in security.

The invention claimed is:

1. A device for heating air entering an oven, that comprises:
   a first open fire burner comprising a first chamber and, inside said first chamber,
      a first duct for inputting air and
      a first regenerative mass for preheating the air input by said first duct,
   a first air feeding device for at least introducing post-combustion air inside said first chamber,
   at least one first gas entry for inputting gas at the first open fire burner, inside the oven,
   a second open fire burner comprising a second chamber and, inside said second chamber,
      a second duct for inputting air and
      a second regenerative mass for preheating the air input by said second duct,
   a second air feeding device for at least introducing post-combustion air inside said second chamber,
   at least one second gas entry for inputting gas at the second open fire burner, inside the oven,
   an operation unit for having
      the first burner working in a combustion mode and burning, inside the oven, gas input from the at least one first gas and air input from the first duct and preheated by the first regenerative mass the first burner providing still reducing combustion gas inside the oven and
      the second burner working in a heat recuperation mode and burning still reducing combustion gas entering the second chamber from the oven with post-combustion air input from the second air feeding device to heat the second regenerative mass and
      after a certain length of time, exchanging the combustion mode and recuperation mode of the burners.

2. The device for heating air according to claim 1, wherein the air feeding device working in a regeneration mode introduces an essentially constant quantity of air, so that the gases emanating from the post-combustion have no reducing power.

3. A device for heating a metallic strip to a set temperature needing the presence of a reducing combustion atmosphere, that comprises
   the device for heating air according to claim 1,
   a preheating chamber provided with a projection device for projecting hot gases from the post-combustion of the burner in the heat recuperation mode towards the strip,
   a heating chamber comprising said burners, wherein the metallic strip is heated by the burner in the combustion mode.

4. The device according to claim 3, further comprising an adjustable three-way valve with an entry connected to a duct for evacuating gases from the heating unit, an exit connected to the gas projection unit of the preheating chamber, and an exit connected to a duct for evacuating the gases outside the installation.

5. The device according to claim 4, that further comprises a control device comprising a set temperature sensor for the metallic strip and an adjustment component for the three-way valve, in order that this valve controls the quantity of hot gases transmitted to the projection device.

6. The device according to claim 3, that comprises a second control device which comprises a sensor for measuring the reducing power of the gases and an adjustment component for adjusting the introduced quantity of air according to the signal from the sensor for measuring the reducing power, and which is configured to control the quantity of air introduced by the air feeding device.

7. The device according to claim 3, wherein the preheating and heating chambers are adjacent and collinear.

* * * * *